(12) United States Patent
Grimwood et al.

(10) Patent No.: US 10,990,509 B2
(45) Date of Patent: Apr. 27, 2021

(54) DEBUGGING SYSTEMS

(71) Applicant: Undo Ltd., Cambridge (GB)

(72) Inventors: Geoffrey Finn Grimwood, Cambridge (GB); Gregory Edward Warwick Law, Cambridge (GB)

(73) Assignee: Undo Ltd., Cambridge (GB)

( * ) Notice: Subject to any disclaimer, the term of this patent is extended or adjusted under 35 U.S.C. 154(b) by 28 days.

(21) Appl. No.: 16/421,770

(22) Filed: May 24, 2019

(65) Prior Publication Data

US 2019/0361798 A1 Nov. 28, 2019

(30) Foreign Application Priority Data

May 24, 2018 (GB) ..................................... 1808519

(51) Int. Cl.
*G06F 11/36* (2006.01)
(52) U.S. Cl.
CPC .................. *G06F 11/3664* (2013.01)
(58) Field of Classification Search
CPC ................................................ G06F 11/3664
USPC ........................................................ 717/125
See application file for complete search history.

(56) References Cited

U.S. PATENT DOCUMENTS

| | | | |
|---|---|---|---|
| 6,003,143 A | 12/1999 | Kim et al. | |
| 6,332,212 B1* | 12/2001 | Organ | G06F 11/323 714/E11.181 |
| 8,307,247 B2 | 11/2012 | Shillington et al. | |
| 8,799,863 B2 | 8/2014 | Alpern | |
| 9,639,330 B2* | 5/2017 | Cao | G06F 3/048 |
| 9,747,191 B1* | 8/2017 | Marolia | G06F 11/3466 |
| 9,823,903 B2* | 11/2017 | Bronkhorst | G06F 11/3664 |
| 2003/0131342 A1* | 7/2003 | Bates | G06F 8/71 717/125 |

(Continued)

FOREIGN PATENT DOCUMENTS

| CN | 104503907 A | 4/2015 |
|---|---|---|
| WO | 2007045920 A2 | 4/2007 |

OTHER PUBLICATIONS

L. Gomez, I. Neamtiu, T. Azim and T. Millstein, "RERAN: Timing- and touch-sensitive record and replay for Android,"2013 35th International Conference on Software Engineering (ICSE), San Francisco, CA, 2013, pp. 72-81, doi: 10.1109/ICSE.2013.6606553. (Year: 2013).*

(Continued)

*Primary Examiner* — Andrew M. Lyons
(74) *Attorney, Agent, or Firm* — Michael Best & Friedrich LLP (57) ABSTRACT

There is provided a system for debugging a computer program comprising computer readable program code. The system comprises, debugging data indicating an execution of the computer program, first and second user devices, configured to display a first and second graphical user interface respectively, each graphical user interface comprising data indicative of an execution of a debugger processing the debugging data. The first and second graphical user interfaces are each configured to display data indicative of a temporal position of the execution of the computer program associated with the other one of said graphical user interfaces, and display data indicative of a position within the computer readable program code associated with the other one of said graphical user interfaces.

18 Claims, 6 Drawing Sheets

(56) References Cited

U.S. PATENT DOCUMENTS

| | | | |
|---|---|---|---|
| 2010/0017788 A1* | 1/2010 | Bronkhorst | G06F 11/3664 |
| | | | 717/125 |
| 2011/0023019 A1* | 1/2011 | Aniszczyk | G06F 9/45504 |
| | | | 717/128 |
| 2012/0102465 A1* | 4/2012 | Bates | G06F 11/362 |
| | | | 717/125 |
| 2014/0258970 A1* | 9/2014 | Brown | G06F 8/47 |
| | | | 717/103 |
| 2016/0266896 A1* | 9/2016 | Fan | G06F 8/33 |
| 2016/0373312 A1* | 12/2016 | El-Nasr | H04L 41/145 |
| 2018/0260306 A1* | 9/2018 | Carey | G06F 11/3664 |
| 2019/0243746 A1* | 8/2019 | Damodaran | G06F 3/04817 |
| 2019/0324892 A1* | 10/2019 | Gabryjelski | G06F 11/3636 |

OTHER PUBLICATIONS

T. G. Moher, "PROVIDE: a process visualization and debugging environment," in IEEE Transactions on Software Engineering, vol. 14, No. 6, pp. 849-857, Jun. 1988, doi: 10.1109/32.6163. (Year: 1988).*

United Kingdom Intellectual Property Office Action for related Application No. GB1808519.1 dated Nov. 27, 2018 (7 pages).

* cited by examiner

DEBUGGING SYSTEMS

FIELD

The present invention relates to systems, methods, apparatus and computer readable program code to facilitate debugging of a computer program.

BACKGROUND

When writing computer programs it is sometimes the case that errors, or 'bugs', are included in the program. Sometimes this is due to typographical errors in writing source code (e.g. omitting a character or substituting one character for another), sometimes due to implementing incorrect functionality (e.g. causing a loop to terminate at one when it ought to terminate at zero) and sometimes due to errors in other programs upon which an author of the program is relying, for example a library routine or even the compiler itself.

A debugger can assist users in identifying and removing bugs from a program. Prior art debuggers tend to focus upon inserting so-called breakpoints into a program and running a program forwards in time, stopping at one or more of the breakpoints in order to examine the state of the program (content of processor registers, content of memory) at that breakpoint in the hope of catching an error before it causes the program to crash. Crashing can take many forms, generally summarised as the program not running as intended, for example a segmentation fault, an unhandled exception or an infinite loop (where a program stops responding to user input and executes the same routines indefinitely). An example of such a prior art debugger is GDB, the GNU Project Debugger.

Some debuggers can work backwards as well as forwards. For example, in WO2007/045920, which is incorporated by reference in its entirety, techniques are described which allow a program, more particularly the program code of a program, to effectively be run backwards. This is helpful as it allows an error to be traced backwards from the moment it caused the program to crash until the error first appeared.

There remains a need to provide an improved system and method for debugging.

SUMMARY

According to a first aspect, there is provided a system for debugging a computer program comprising computer readable program code. The system comprises, debugging data indicating an execution of the computer program, first and second user devices, configured to display a first and second graphical user interface respectively, each graphical user interface comprising data indicative of an execution of a debugger processing the debugging data. The first and second graphical user interfaces are each configured to display data indicative of a temporal position of the execution of the computer program associated with the other one of said graphical user interfaces, and display data indicative of a position within the computer readable program code associated with the other one of said graphical user interfaces.

The first graphical user interface may be displayed on the first user device associated with a first user. The second graphical user interface may be displayed on the second user device associated with a second user.

For example, the first graphical user interface displays data indicative of a temporal position of the execution of the computer program associated with the second graphical user interface (e.g. the temporal position of a second user of the second user device), and display data indicative of a position within the computer readable program code associated with the second graphical user interface (e.g. the position within the computer readable program code of the second user).

Being able to display both the temporal position of the execution of the computer program and the position within the computer readable program code of each user provides details of the events internal to the underlying technical system. For example, a program to be debugged may represent a technical system. The program may have a fault which is to be determined using the debugger and debugging data. The graphical user interfaces of the system of the first aspect provide on-going feedback to users about the internal state of the program being debugged.

The data indicative of a temporal position of the execution of the computer program associated with the first (or second) graphical user interface may correspond with the temporal position in which a user of the first (or second) user device is located. That is, a user of the first user device may be viewing a portion of the program being debugged at a time position within the program, where the time position is the temporal position of the execution of the computer program associated with the first user device.

The data indicative of the position within the computer readable program code of the first (or second) graphical user interface may correspond to the location within the program code that the user is (or was) viewing. The location within the program code may correspond with a line of code, for example.

Advantageously, the system provides a way in which two or more users may collaborate when debugging a computer program. When performing collaborative debugging of computer programs, multidimensional elements must be taken into account. For example, when debugging a program a user has a position in the computer readable program code and a time within the computer program. By displaying, on the first graphical user interface, both data indicative of a temporal position within the execution of the computer program and a position within the computer readable code associated with the second graphical user interface, a first user associated with the first graphical user interface is able to determine both when and where a second user associated with the second user graphical interface is, and vice versa.

Of course, the first and second graphical user interface may be displayed on the same user device associated with a single user. This may be advantageous for a user to compare different parts of an execution side-by-side, such as iterations of a loop, for example.

The debugging data may comprise a recording of the computer program being executed. The debugging data may comprise data which can be used to perform backwards debugging, such as data indicating the state of the computer program at one or more points within the execution of the computer program. For example, the debugging data may comprise data defining a complete or substantially complete copy of memory and registers used by the computer program at a starting state of the computer program. The debugging data may comprise data defining content read from pages of memory accessed during execution of the computer program. The debugging data may comprise an event log which logs non-deterministic events in the program as they occur during execution of the program so that when the program is replayed in the debugger, the non-deterministic events can be synthesised based on the log to enable replay to any earlier state of the program.

The computer readable program code may be source code or assembly code of a program to be debugged.

During a debugging session, execution of the debugger may be carried out at the server. For example, a first instance of the debugger may be executed at the server, the first instance associated with the first graphical user interface, and a second instance of the debugger may be executed at the server, the second instance associated with the second graphical user interface. Alternatively, execution of the debugger may be carried out at either or both of the user devices on which the first and second graphical user interfaces are displayed.

The first and second graphical user interfaces may be each further configured to display data indicative of the temporal position of the execution of the computer program associated with the first and second graphical user interfaces respectively and display data indicative of the position within the computer readable program code associated with the first and second graphical user interfaces respectively.

For example, the first graphical user interface may be configured to display both the data indicative of the temporal position of the execution of the computer program associated with the first graphical user interface (e.g. associated with the first user) as well as the data indicative of the temporal position of the execution of the computer program associated with the second graphical user interface (e.g. associated with the second user), and the second graphical user interface may be configured to display both the data indicative of the temporal position of the execution of the computer program associated with the first graphical user interface (e.g. associated with the first user) as well as the data indicative of the temporal position of the execution of the computer program associated with the second graphical user interface (e.g. associated with the second user).

The first and second graphical user interfaces may each further be configured to display the data indicative of the temporal position of the execution of the computer program associated with the first graphical user interface and data indicative of the temporal position of the execution of the computer program associated with the second graphical user interface simultaneously.

For example, the first graphical user interface may display both a first and second user's temporal position at the same time and the second graphical user interface may also display both the first and second user's temporal position at the same time.

The first and second graphical user interfaces may display the data indicative of the position within the computer readable program code associated with the first graphical user interface and data indicative of the position within the computer readable program code associated with the second graphical user interface at the same, or may only show one of the positions within the computer readable program code associated with one of the first or second graphical user interfaces at any one time.

The first and second graphical user interfaces may be configured to display data indicative of the execution of the debugger simultaneously. That is, first and second users viewing the first and second graphical user interfaces may view data displayed on the graphical user interfaces at the same time (e.g. in real time). For example, first and second users may be taking part in the same debugging session simultaneously, and the first and second graphical user interfaces may display data indicative of the execution of the debugger to each user simultaneously.

The system may further comprise a server. The server may comprise the debugging data, and wherein the server is configured to provide the first and second user devices with access to the debugging data.

The debugging data may be stored remote from the user devices. For example, the debugging data may be stored on memory at a server, accessible by the user devices. The user devices may be able to connect to the server over a network, such as the internet or an intranet. The server may only allow a user device access to the debugging data upon authenticating the user device or user.

The server may further comprise the debugger; and wherein the server is configured to provide one or both of the first and second user devices with access to the debugger.

For example, the debugger may be remotely executed at the server by the user devices. Each user device may connect to the server storing the debugger and submit instructions which cause the debugger to execute at the server, where the server provides the data indicative of the execution of the debugger to be output on the graphical user interfaces. Alternatively, the debugger may be downloaded, or otherwise obtained, and run locally on the user devices. In such an implementation, data such as the positions of each user may be communicated between each user device via the server, or may be communicated directly between user devices (peer to peer). In some implementations, some user devices may execute a locally stored debugger while other user devices may execute the debugger on the server during a debugging session. The debugging data may also be downloaded such that a user device can process the debugging data locally. Optionally, only a portion of the debugging data may be downloaded, the portion corresponding to a portion of the program code a user wishes to review.

The server may be configured to send to the first user device, the data indicative of the temporal position and the data indicative of the position within the computer program readable code associated with the second user device, and send to the second user device, the data indicative of the temporal position and the data indicative of the position within the computer readable program code associated with the first user device.

The server may also be configured to send, to the first user device, the data indicative of the temporal position and the data indicative of the position within the computer program readable code associated with the first user device, for example when the debugger is executed at the server. The server may also be configured to send, to the second user device, the data indicative of the temporal position and the data indicative of the position within the computer readable program code associated with the second user device.

The server may be further configured to determine that the first user has marked a portion of the debugging data and based on said determination, prevent the second user device from accessing said portion of the debugging data.

The server may be further configured to, receive an indication that user has marked a portion of data as private, generate metadata associated with the portion of data, the metadata indicating that the portion of data is private, receive a request for access to the portion of data, identify the metadata associated with the portion of data, the metadata indicating that the portion of data is private, and prevent access to the portion of data.

The first and second graphical user interfaces may be configured to present a timeline of the computer program, the timeline comprising the data indicative of the temporal position of the execution of the computer program associated with the other one of said graphical user interfaces.

The timeline comprising the data indicative of the temporal position of the execution of the computer program may comprise presenting a marker on the timeline at a temporal position on the timeline corresponding with the temporal position of the execution of the computer program associated with the other one of said graphical user interfaces.

A marker provides a user with information as to when in the code another user is. A plurality of markers may be displayed, one for each user involved in the debugging session. A marker may also be displayed which indicates the temporal position of a user's own temporal position within the code.

The markers may be user selectable. For example, a first user viewing the first graphical user may select a second user's marker. Selecting the second user's marker may cause the first graphical user interface to update. For example, selecting the second user's marker may cause the first graphical user interface to display program code associated with the second user's temporal position. That is, the first user can jump from their temporal position within the execution of the computer program to the second user's temporal position by selecting the second user's marker.

The first and second graphical user interface may be further configured to display data indicative of a comment added by one of the first or second devices.

For example, the graphical user interfaces may provide for the input of text such that users may comment on portions of the debugger process. For example, a user may want to comment on a specific line of code at a specific time, or a specific variable value, or piece of memory at any point in time. When a user inputs a comment relating to a portion of the code or of the execution of the program being debugged, the comment may be saved and transmitted to the other user devices. The other user devices may then display data indicative of the comment, for example such that users of the other user devices may view the comment.

The data indicative of the comment may be displayed as a user selectable icon on the graphical user interface, wherein user selection of the icon causes the graphical user interface to display the comment.

For example, the user selectable icon may be a speech bubble, which when selected by a user, such as by pointing a cursor over the icon and selecting the icon, may cause the comment associated with the icon to be displayed. The comment may be displayed in a window within the graphical user interface.

Alternatively or additionally, the graphical user interface may comprise navigation buttons, such as arrow keys, which allow a user to move through multiple comments.

The data indicative of the comment may have an associated position within the computer readable code, and wherein the graphical user interface may further be configured to display a portion of the computer readable program code at the associated position within the computer readable program code upon user selection of the icon.

For example, if a first user has made a comment about a certain portion of the code, a second user may select the icon associated with the first user's comment and be presented with the first user's comment and with the portion of code to which the comment relates. The portion of code to which the comment relates may be the data indicative of the position within the computer readable code.

The user selectable icon may be displayed on the timeline at a temporal position associated with the comment.

For example, the temporal position associated with the comment may be the time within the computer program that a user added the comment, and the user selectable icon may show up on the timeline at the corresponding time within the computer program.

In a second aspect of the invention, there is provided a method for debugging a computer program comprising computer readable program code. The method comprises displaying on first and second user devices respective first and second graphical user interfaces displaying data indicative of an execution of a debugger processing a debugging data, the debugging data indicating an execution of a computer program, wherein the displaying comprises, at the first and second graphical user interfaces displaying data indicative of a temporal position of the execution of the computer program associated with the other one of said graphical user interfaces, and displaying data indicative of a position within the computer readable program code associated with the other one of said graphical user.

In a third aspect of the invention, there is provided a user device for use in debugging a computer program comprising computer readable program code. The user device comprises a transceiver, the transceiver configured to receive data indicative of a temporal position of the execution of the computer program associated with a second user device and data indicative of a position within the computer readable program code associated with a second user device. The user device further comprises a display comprising a graphical user interface configured to display data indicative of an execution of a debugger processing using debugging data, wherein the graphical user interface is configured to, display the data indicative of the temporal position of the execution of the computer program associated with the second user device, and display the data indicative of the position within the computer readable program code associated with the second user device.

A server may provide the data indicative of the temporal position of the execution of the computer program associated with the second user device and the data indicative of the position within the computer readable program code associated with the second user device. Alternatively, the said data may be provided directly by the second device.

A server may provide access to the debugging data and a debugger, such that the user device may execute, at the server, the debugger. Alternatively, the user device may download from the server, or otherwise obtain, the debugging data and debugger, and execute the debugger locally on a processor at the user device. In embodiments where the user device executes the debugger locally, the user device may send data indicative of a temporal position of the execution of the computer program associated with the user device and data indicative of the position within the computer readable program code associated with the user device to the server, or to a second user device.

In a fourth aspect of the invention, there is provided a server for use in debugging a computer program comprising computer readable program code. The server comprises a memory comprising debugging data indicating an execution of the computer program, a processor configured to execute a debugger using the debugging data, and a transceiver configured to send to a first user device data indicative of a temporal position of the execution of the computer program associated with a second user device, and data indicative of a position within the computer readable program code associated with the second user device.

The server may also be configured to send to the second user device data indicative of a temporal position of the execution of the computer program associated with the first user device, and data indicative of a position within the computer readable program code associated with the first user device.

The server may provide one or both of the first and second user devices with access to the debugger and debugging data. The access may be provided via the transceiver.

In a fifth aspect of the invention, there is provided a computer readable medium carrying computer readable code, that when executed, causes one or more processors to carry out the method of the second aspect.

Optional features of different aspects may be combined.

BRIEF DESCRIPTION OF THE DRAWINGS

Embodiments of the invention will now be described, by way of example, with reference to the accompanying drawings, in which.

DETAILED DESCRIPTION

Computer programs are multi-dimensional. For example, a user can specify both a position within program code, such as a line of source code or machine code, and a temporal position within an execution of the program, e.g. a time elapsed since the start of the execution. In cases where two (or more) users want to debug a program in a collaborative manner at the same time, the multi-dimensional aspect of computer programs must be taken into account. For example, when debugging a particular execution of a computer program, two users may be viewing the same line of source or machine code (the "where"), but may be at different temporal positions within the execution of the computer program (the "when").

Figure 1:
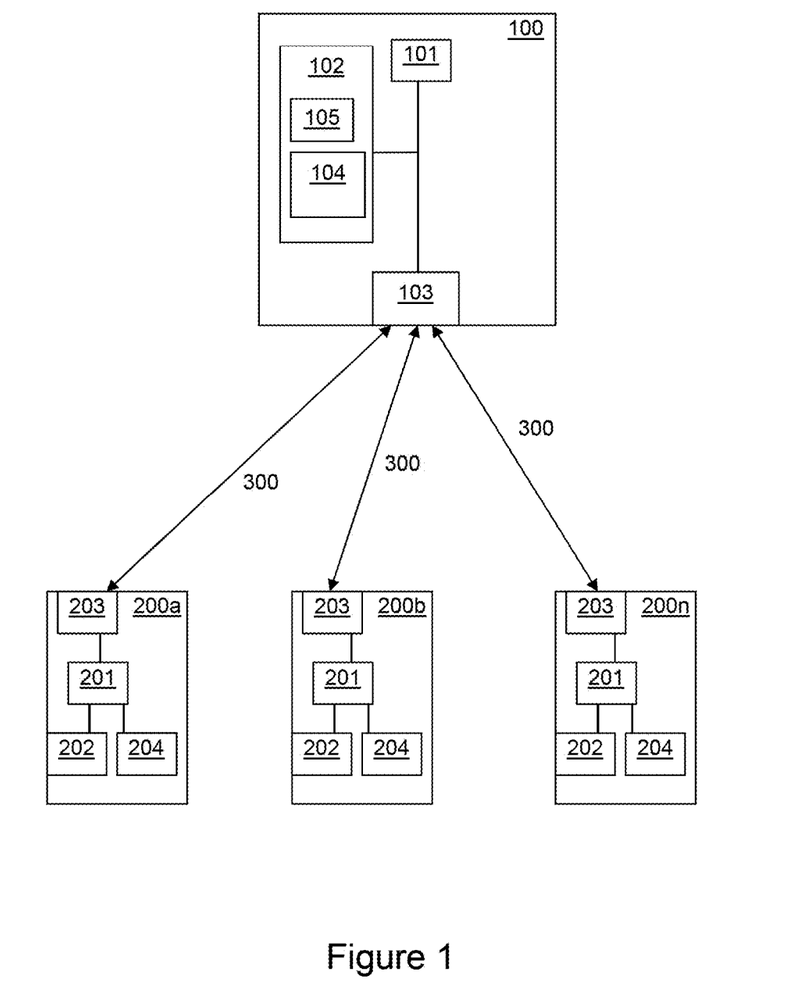
FIG. 1 is a schematic illustration of a system capable of implementing an aspect of the invention.

Referring to FIG. 1 there is shown a system which provides an improved debugging system and which can be used to provide collaborative debugging. The system comprises a server 100 and a plurality of user devices 200a, 200b, 200n. The user devices 200 may be any suitable device that can connect to the server 100, such as a computer, laptop, mobile phone, tablet, PDA, etc. The user devices 200 are connected to the server 100 via a network 300. For example, the network 300 may be the internet or a local intranet. It will be appreciated that any suitable connection between the user devices 200 and the server 100 may be used so as to facilitate the transfer of data between the user devices 200 and the server 100.

The server 100 comprises a processor 101, memory 102, and transceiver 103, and the user device 200 comprises a processor 201, memory 202, transceiver 203, and user interface 204. The transceivers 103, 203 are used to transmit data to and from the user device 200 and the server 100.

The memory 102 of the server 100 stores debugging data 104 relating to a computer program to be debugged and a debugger 105. The debugging data 104 is data which can be used by the debugger 105 to assist a user in debugging the computer program. For example, the debugging data 104 may comprise computer readable program code representing the program to be debugged (e.g. in the form of machine code and/or source code), and data which can be used by the debugger 105 to perform debugging. The debugging data 104 may comprise replay debugging data which can be used to replay an execution of the computer program. The debugging data may additionally or alternatively comprise backwards debugger data, allowing for backwards debugging of an execution of the computer program.

The debugging data can be generated by "recording" an execution of a program and storing snapshots of the execution process, as described in WO2007/045920. The debugging data may represent the state of the program at one or more points within the execution of the program. For example, the debugging data may comprise data defining a complete or substantially complete copy of memory and registers used by the program at a starting state of the code. Alternatively or additionally, debugging data may comprise data defining content read from pages of memory accessed during execution of the code. The debugging data may also comprise an event log which logs non-deterministic events in the program as they occur during execution of the program so that when the program is replayed, the non-deterministic events can be synthesised based on the log to enable replay to any earlier state of the program.

The debugging data may provide snapshots of the program at various locations within the program and that can be used to provide deterministic replay of the program.

The server 100 may perform compression operations on the debugging data 104. For example, recordings that share files could be compressed by only storing one copy of the shared file in the memory 102. Recordings in the debugging data 104 that contain a certain file or have a specific starting memory footprint could be marked as linked, making it easy to discover similar recordings. Debugging data 104 can have permissions applied to restrict certain users or groups accessing the debugging data.

The debugging data 104 may be created using debugging software running either on a user device 200 or at the server 100. If created on the user device 200, the debugging data 104 may be uploaded to the server 100 via the network 300. For example, a first user using user device 200a may generate debugging data 104 by making a recording of the program to be debugged. The first user may then upload the debugging data 104 to the server 100, either manually or automatically. A second user using user device 200b may then be able to access the debugging data 104. The first user or the server 100 may apply certain permission to the debugging data 104 such that only authorised users may access the debugging data 104. It will be appreciated that the source of the debugging data 104 may be any suitable source. It will also be appreciated that the server 100 and one or more of the user devices 200 may be the same machine.

The user device 200 provides a graphical user interface (GUI) which can be displayed on the user interface 204. For example, the user interface 204 may comprise any type of display (such as a monitor) capable of displaying the GUI. The GUI may be a web-based GUI, for example accessed through a browser application executing on the user device 200. For example, the GUI may be provided by the server 100 and accessed over the network 300 by the user device 200. The GUI is used to provide a visual interface with the server 100. For example, the GUI may be used to access and execute the debugger 105 at the server 100. The GUI may display details of the debugger 105, or of the debugging data 104. For example, the GUI may provide the ability to view source or assembly code, backtraces, threads, the contents of memory and registers, breakpoints, watchpoints, etc. A schematic view of a GUI 400 is shown in FIG. 2.

The GUI 400 and the server 100 allow two or more users to access the debugger 105 in a collaborative manner where each user can control a separate instance of the debugger 105. For example, if a first user connects to the server 100 at a first time and starts running the debugger 105 with the debugging data 104, a first instance of execution of the debugger is created and displayed via the GUI 400 on the first user's device. At a second time a second user connects to the server 100 and starts running the same debugger 105 with the same debugging data 104, such that a second instance of execution of the debugger is created and displayed via the GUI 400 on the second user's device. That is, in a given debugging session, there may be multiple separate instances of the debugger 105 running at the server 100, one instance for each user taking part in the debugging session, with each instance using the same debugging data 104. Data relating to each individual user's instance of the debugger is communicated to each other user in the debugging session. For example, the first user can see via the GUI 400 that the second user has started debugging, and can see when and where within the code the second user is.

Data relating to one of the user's interaction with the debugger 105 may be provided to the other users. In particular, the techniques described herein allow for information about a user's current location to be provided in two dimensions (when and where). For example, as described in more detail below, a user's temporal position within a timeline of the program may be communicated to the other users, in addition to a location of the user within the program code to be debugged. Similarly, comments added by a user at a particular location within the program may be communicated to the other users. By providing information about a user's location in two dimensions, the systems and methods described herein aid debugging of program code in, for example, situations in which a bug in program code that executes more than once within a recording of an execution manifests only during a subset of those executions.

Figure 2:
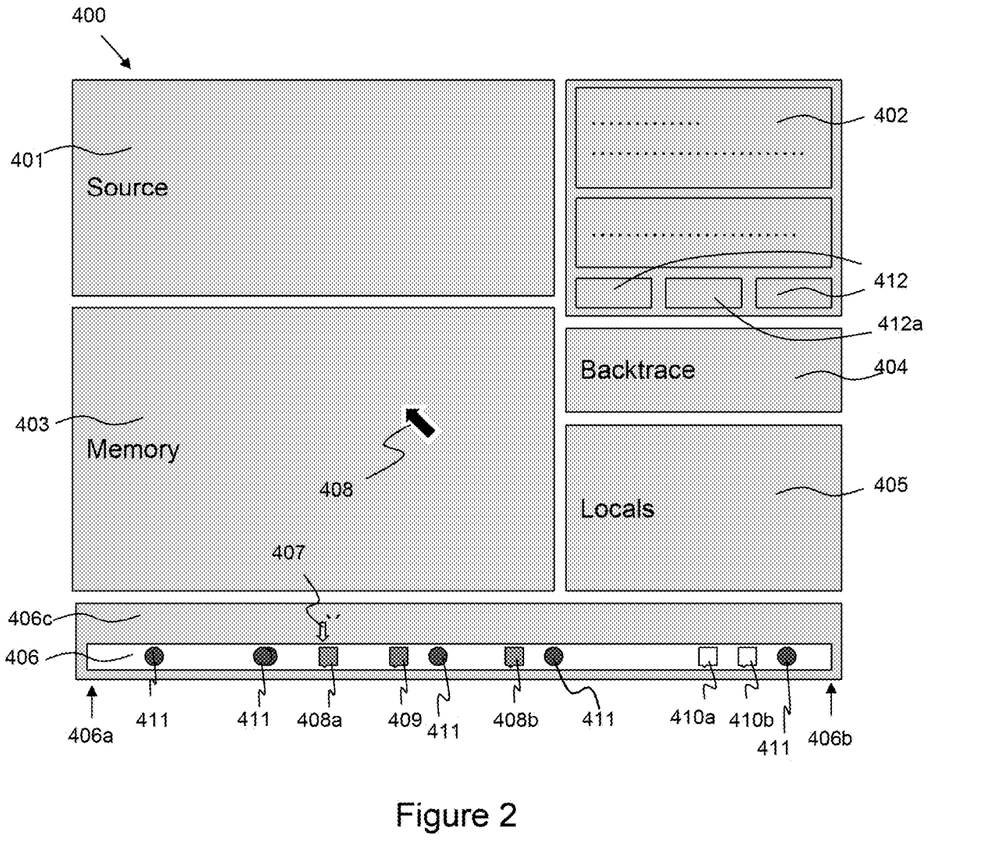
FIG. 2 is a schematic illustration of a graphical user interface.

In the embodiment shown in FIG. 2, the GUI 400 has six panels which each display outputs of the debugger 105. In the example shown, a first panel 401 shows a position at which the user is within the code of the program being debugged 401, a second panel 402 shows comments made by users, a third panel 403 shows details as to what is currently stored in memory, a fourth panel 404 shows backtrace information, a fifth panel 405 shows locals (e.g. showing variables that are defined in the local scope, which is generally the function or method that is currently being executed), and a sixth panel 406c shows a timeline of the program. While not shown in FIG. 2, an additional panel may show which users are currently taking part in the debugging session, and may provide additional information relating to the users, such as when a particular user last logged in/logged out. It will be appreciated that other or alternative panels which are used in debuggers and backwards debuggers as will be known to the skilled person may be included within the GUI 400. It will also be appreciated that not all panels shown in FIG. 2 are required.

In a traditional debugging interface, a source or assembly view is used to show the code currently being executed. In the example shown in FIG. 2, the GUI 400 additionally provides a mechanism (in particular the timeline 406) to indicate a temporal location within the recording. The timeline 406 represents temporal positions within the program being debugged during a debugging session. It is to be understood that a single user may be associated with a plurality of debugging sessions. A first end 406a of the timeline indicates, for example, t=0, e.g. the start of the program and a second end 406b indicates t=t_end, e.g. the end of the recorded execution of the program. A marker 407 is provided which displays to the user their current temporal position within the program. That is, marker 407 visually depicts "when" in the recorded execution of the program, the user is currently debugging. As the user moves in time through the recorded execution of the program, the marker 407 moves along the timeline 406. If the user moves forward in time in the program, the marker 407 moves to the right of FIG. 2. If the user moves backwards in time in the program, the marker 407 moves to the left of FIG. 2. However, it will be appreciated that the direction of movement of the marker 407 may be reversed. It will also be appreciated that the orientation of the timeline may be different to that shown, such as vertical where movement of the marker 407 may be up or down. While the timeline 406 has been described as representing the start and end of the program, the timeline 406 may represent a portion of the program. For example, the first end 406a and/or the second end 406b may indicate separate intermediate portions of the code.

The timeline 406 displays icons 408a, 408b, 409, 410a, 410b indicative of user comments, where a first user has made comments 408a and 408b, a second user has made comment 409, and a third user has made comments 410a and 410b. The location of the icons 408, 409, 410 relative to the timeline 406 correspond to the temporal location at which the user who made the comment was within the program when the comment was made. Comments made by different users may be given a different visual appearance within the timeline. For example, different colours or shapes of display icons may be used to differentiate between different user's comments. For example, the first user's comments 408a, 408b may be highlighted in a first colour, the second user's comments 409 may be highlighted in a second colour and the third user's comments 410a, 410b may be highlighted in a third colour. A key may be displayed (not shown) which maps each user identity to their colour or shape. The timeline can display other useful information such as breakpoint hits 411 (shown as circles) within the code, located at their relevant temporal positions within the recording of the execution of the program.

A cursor 408 may be used to interact with the GUI 400. For example, using the cursor 408, a user may select one of the comments on the timeline 406 by, for example, clicking on, or hovering over, the comment icon 408a, 408b, 409, 410a, 410b. This action brings up the user comment associated with the selected comment icon in the comments panel 402. The comments panel 402 may also display the user's identity associated with the selected comment. Additionally, the other panels may also be updated relating to the position of the selected user's comment. For example, the source panel 401 may display a portion of code located at a position within the code (the 'where') that a user was at when the user made the comment.

Comments made by users may also be navigated using navigation buttons 412. For example, the navigation buttons 412 may be depicted as left and right arrows, where selecting the right arrow loads the next comment in a temporal sequence and selecting the left arrow loads a previous comment in a temporal sequence. A reply button 412a may be provided which, when selected, allows a user to reply to a comment. Further options may be provided. For example, a user may be able to select a particular user of interest, such that cycling through the comments only loads the selected user's comments in sequential order. That is, each user's chain of comments may be independently cycled through. This allows each user to "tell the story" of their debugging process for others to follow, or for them to come back to at a later date. In this way, the process of debugging may be facilitated, by allowing other users to build on the work already carried out by previous users in contrast to most known debuggers that require each user to work in isolation. The enabling of such collaborative debugging may be particularly beneficial to teams, whose members may work on particular debugging data at different times. For example, the techniques described herein may be particularly beneficial for allowing the debugging of particular debugging data by globally distributed teams.

Figure 3:
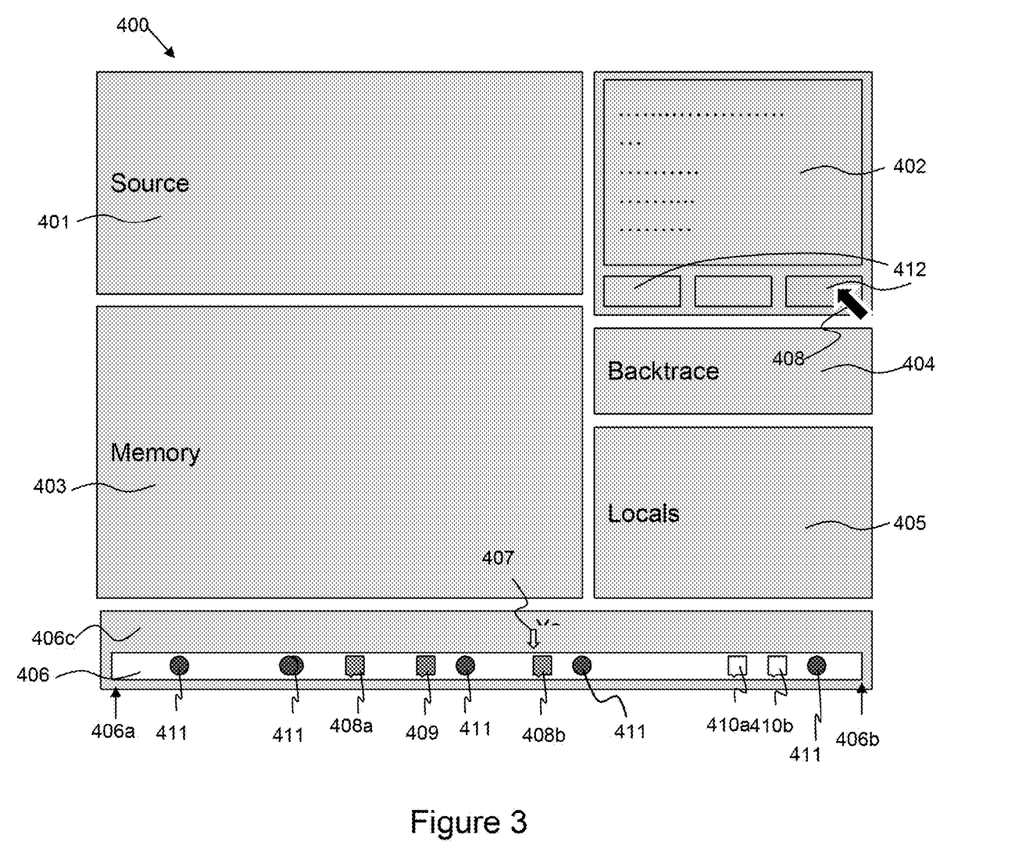
FIG. 3 is a schematic illustration of the graphical user interface of FIG. 2.

FIG. 3 shows a schematic view of the GUI of FIG. 2, where a user has selected a navigation button 412 (such as a right arrow). As can be seen, the marker 407 has moved along the timeline 406 from the temporal position associated with the first user's first comment 408*a* to the temporal position associated with the first user's second comment 408*b*. The source panel 401 has been updated to reflect the updated position in the code of the program.

The GUI may provide a comment icon (not shown), which when selected, creates a new comment associated with the temporal position of the user within the program. When a new comment is added by a user, it is uploaded to the server 100. The server 100 then can communicate the new comment to the other users. In the example shown, a comment icon associated with the comment is added to the timeline at the relevant temporal position. Comments may be stored as a separate file in the memory 102 of the server 100, to which the debugger 105, or GUI 400 can access. It will, however, be appreciated that the comments may be stored and/or provided to each user in any suitable way. For example, comments may be stored in a separate database or sent directly between users.

Other users may be able to add further comments to user comments. For example, the first user may select the second user's comment 409, causing it to be displayed in the comment panel 402. The first user may then select the reply button 412*a* which then allows the first user to add an additional comment to the second user's comment 409 and save the additional comment. The GUI 400 may also provide the ability for a user to edit another user's comments by, for example, selecting an appropriate button on the GUI 400. Permissions may be used to control which users can edit another user's comments. For example, the first user may be granted permission to edit the comments of all other users, whereas the second user may not have permission to edit the comments of other users.

Figure 4:
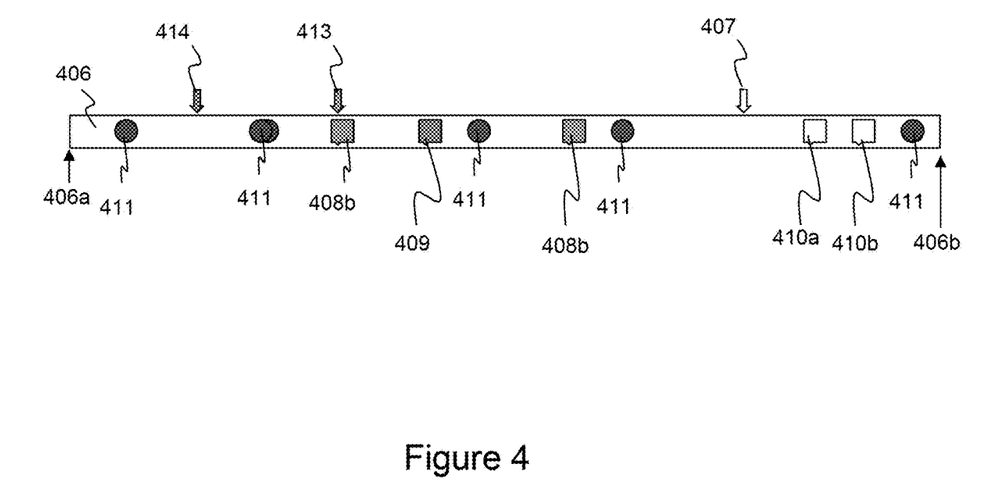
FIG. 4 is a schematic illustration of a timeline, which can be displayed in the graphical user interface of FIGS. 2 and 3.

When two or more users are simultaneously accessing the debugger 105 to debug the same execution of a program, the timeline 406 simultaneously shows the temporal position of each of the users (or in the case that the timeline 406 shows only a portion of the program's execution, each of the users whose temporal position is within the slice of time shown in the timeline 406). That is, as each user's temporal position changes within the program as they use the debugger 105, the server 100 communicates the updated temporal position to each other user. This is shown in FIG. 4. As in FIGS. 2 and 3, marker 407 shows the temporal position of the first user in the program. A second marker 413 shows the temporal position of the second user in the code and a third marker 414 shows the temporal position of the third user in the code. In this way, two users may simultaneously debug different parts of the same computer program, thereby improving the speed with which debugging can occur. Further, when one user would like assistance or to demonstrate an issue to another user, the other user may easily discover the location, both temporal (the when) and within (the where) the computer program code, that the other user is currently debugging. For example, the marker on the timeline indicates the temporal position of a user, and selection of the marker may cause the GUI to display program code at the position within the computer readable program code that the user is located.

The colour of the markers may be different so as to readily identify the temporal location of each user in the program being debugged. The colour of the user's marker may be the same colour as the colour of the user's comment icon. In some implementations, the marker 407, 413, 414 may be selectable to provide navigation to a position within the computer readable program code that a given user is at. For example, the first user may click on the second marker 413, and this may cause the source panel 401 to update to the position within the computer readable program code that the second user is currently at. In such an implementation, only the temporal position of each of the users is shown simultaneously, with the position within the code only being shown for a given user in the source panel 401. However, in other implementations the position within the code of each user may be shown simultaneously. For example, program counters of each user may be simultaneously displayed which provide the position of each user within the code. It will be appreciated that the term simultaneously contemplates lag from various sources, such as lag in the network 300. In other implementations, users who are at the same position in the code may each be informed of other users at the same position. For example, if first and second users are located at the same position within the code, their respective GUI's 400 may provide information indicating that both the first and second users are located at the same position.

When a user leaves the debugging session, their last known position (when and/or where) may be stored by the server 100 such that when the user logs back on to the session, they resume from the same position they were at when they logged off. Information relating to a logged off user may be communicated, via the GUI 400, to other users in the debugging session. For example, if the second user logs out of the debugging session, their marker 413 may be updated to appear greyed out on the timeline 406. This would indicate to the first and third users the last temporal position of the second user prior to the second user logging off. The second user's last known position within the code may also be communicated to the first and third users. This may be beneficial, for example, when a first user needs to leave a debugging session but wants a second user to review a location in the program code or to continue debugging from that location after the first user leaves. The second user may not be able to immediately move to review that location (e.g. because they are busy debugging another location). The present techniques thereby allow for further continued interaction by guiding the second user based on the first user's last location, without requiring the second user to cease their current debugging activities.

The debugging data 104 may also comprise metadata and such metadata may be represented within the GUI 400 to further facilitate collaborative debugging. Metadata may be created by the program being recorded at the time it is executing and stored in or with the event log. Such data can then be presented to the user at during debugging and provide useful high-level context for the state of the program at a given temporal position or position within the computer readable program code. For example, in the case of backwards debugging, metadata may, for example, include a time of recording, hostname of a system that created the recording, an indication that the recording is of a suite of tests, a test name that is currently executing and/or in a recording of multiple tests, each test could be separated by a metadata marker inserted in the event log. Metadata may be determined by the server 100 or by a recording tool which was used to create the recording.

Additional metadata may be obtained through integration of the server 100 with one or more development and operations (or "DevOps") tools. For example, integration with version control would make it possible to tie individual recordings back to specific change-sets and find source code from a code repository when debugging a recording. Integration with continuous integration ("CI") systems may provide a history of recordings of various executions of a given job, allowing a user to easily and quickly compare a recording of a test failure against a recording of the last successful execution. In alternative cases where a user is using a DevOps tool which is not integrated with the server, an API may be provided to allow for data from the DevOps tool to be made obtained and used by the server 100.

In some implementations, one or more portions of source code (or any other part of the debugging data) may be hidden from certain users during collaborative debugging. For example, one may consider the case where a software vendor and its customer have collaborated to develop a program. During collaborative debugging, the software vendor may wish to hide certain portions of their source code from the customer. Similarly, the customer may wish to hide certain portions of their source code from the vendor. There are numerous ways that this may be done. For example, a user's GUI may provide suitable user interface elements to allow a user to mark as private a portion of code that they do not want to be shared and/or to allow a user to specify that a portion of code is only to be shared with selected authorised users. In response to receiving such an indication from the user, metadata may be stored encoding the authorization status of the portion of the source code. The metadata may be separate to the metadata described above, or may be the same. During collaborative debugging, the user device 200 of the user, or alternatively the server 100, may use the metadata to determine that a portion of the code is marked as private (e.g. not to be shared, or only to be shared with certain users), and subsequently this portion of source code is not sent to any user devices 200 not authorized to view the portion of the code. In such situations, an unauthorised user would not see the marked source code in their GUI.

For example, the server 100 may determine (e.g. by processing metadata) that the user of the first user device 200a has marked a portion of the computer readable program code as private. Based on this determination, the server will keep this portion of the computer readable program code private by, for example, not sending the portion of the computer readable program code to the second user device 200b if requested by the second user device 200b (e.g. not providing the second user device with access to this portion of code). In other examples, the server 100 may determine that the user of the first user device 200a has marked a portion of the computer readable program code to only be shared with a third user device 200n. Based on this determination, the server will not send the portion of the computer readable program code to the second user device 200b, but may send the portion of the computer readable program code to the third user device 200n if requested.

The server 100 (or the user device 200a) may prevent any data in the debugging data from being sent to other user devices. For example, in some implementations a user may want to prevent another user from seeing the execution of a particular part of the source code. For example, the first user may want to prevent the second user from seeing execution of a particular function. The first user may mark said function as not to be shared with the second user (or any particular ones of other users), where the marking is stored as metadata. When the second user plays the recording forwards or backwards, the recording may then skip over that function during playback based on the metadata indicating that the function is marked. There are a number of ways this may be achieved. For example, the server 100 may detect that the function is marked as not to be shared by identifying the metadata, and prevent the second user from accessing or viewing the function. Alternatively, the user device of the second user may determine that the function is marked as not to be shared, and prevent access to the function. Similarly, users may want to hide certain data that contains confidential/proprietary information, or personally identifiable information. In some implementations, the user may mark any portion of the recording or metadata associated with the recording as not to be shared. Said marked portions may then be prevented from being accessed by unauthorised users as described above.

Figure 5:
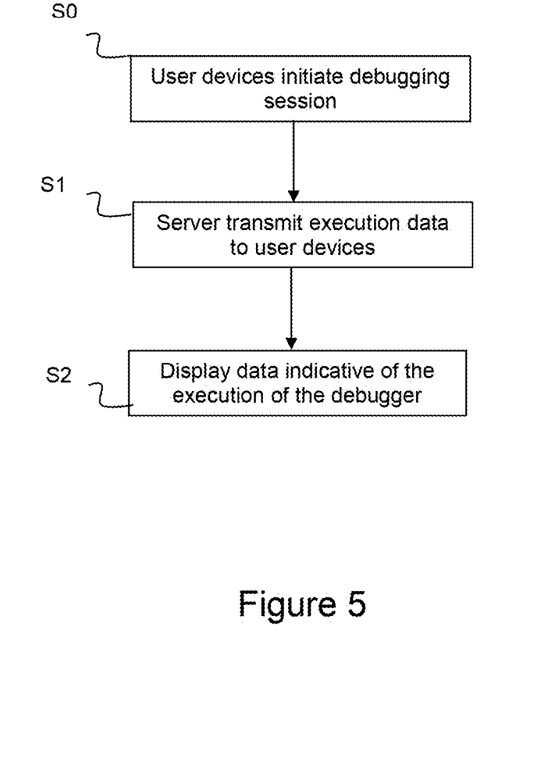
FIG. 5 is a flow chart illustrating a method according an aspect of the invention.

FIG. 5 shows a flow chart according to a method of the present invention, where first and second user devices 200a, 200b, take part in a debugging session.

At step S0, the first and second user devices 200a, 200b connect to the server 100 and initiate a debugging session. Each user device 200a, 200b executes, on the server 100, a separate instance of the debugger 105 using the debugging data 104. However, it will be appreciated that the user devices 200 may execute locally stored debuggers.

At Step S1, the server 100 transmits data indicative of the execution of the debugger 105 processing the debugging data 104 to both of the user devices 200a, 200b. The data indicative of the execution of the debugger 105 processing the debugging data 104 may comprises data indicative of the temporal position of the execution of the computer program data and data indicative of the position within the computer readable program code associated with one or more of the user devices 200a, 200b.

At step S2 first and second graphical user interfaces, displayed on first and second user devices respectively, display the data indicative of the execution of the debugger 105 processing debugging data, where displaying comprises displaying data indicative of a temporal position of the execution of the computer program associated with the other one of said graphical user interfaces (e.g. the first graphical user interface displays the temporal position associated with the second user), and displaying data indicative of a position within the computer readable program code associated with the other one of said graphical user. This allows the first user to determine both when and where a second user is within the program code. Of course, while two user devices have been described, there may be more user devices which take part in the debugging session, and receive and display the data indicative of temporal position and position within the computer readable program code of the other users.

Figure 6:
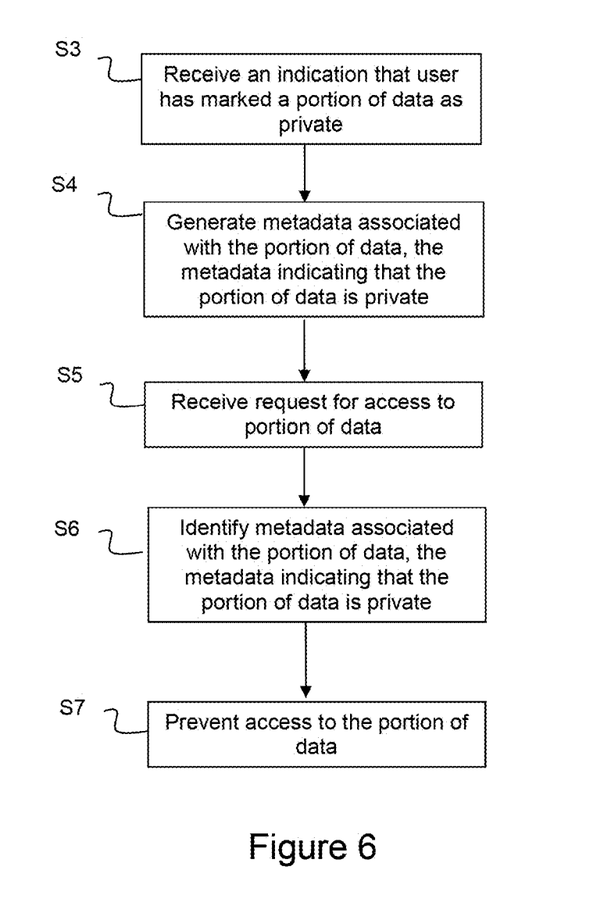
FIG. 6 is a flow chart illustrating a further method according an aspect of the invention.

FIG. 6 shows a flow chart according to a method of the present invention, where a user marks a portion of data, such as a portion of source code or any other type of data relating to the debugging data, as private.

At Step S3 an indication is received that a user has marked a portion of data as private. The portion of data may be a portion of the source code, one or more functions, personal information, or any other type of data associated with the debugging data. The indication may be received by way of a user interacting with their user device by selecting suitable user interface elements on the GUI, such as one or more buttons, drop down menus, etc. For example, the first user may use the GUI on their user device 200a to mark a portion of source code as private.

At Step S4, metadata is generated associated with the marked portion of data, the metadata indicating that the portion of data is private (e.g. not to be shared, or only to be shared with authorised users). The metadata may also be used to identify any one of authorised and/or unauthorised users with which the marked data may be shared or not shared with respectively. The metadata may be in any suitable form and may be generated in any suitable location. For example, the metadata may be generated at the user device 200a, or may be generated at the server 100. The metadata may be sent to the server 100 if the metadata is not generated at the server 100. The metadata may be stored such that it is accessible to the server 100 and/or the first user device 200a.

At Step S5, a request for access to the portion of the data is received. For example, the request may be received at the server 100 by the second user device 200b during a collaborative debugging session. In response to a request, the server 100 may check to see if there is metadata indicating that the requested portion of the data is marked as private.

At Step S6, in response to receiving the request for the portion of data, the metadata associated with the portion of data is identified. For example, the server 100 may access a database or other storage device which stores the metadata and retrieve the metadata.

At Step S7, access to the portion of data is prevented. For example, the server 100, or the first user device 200a, may process the metadata and determine that access to the portion of data is to be prevented. In response, the server 100 may then prevent the marked portion of data from being sent to unauthorised user devices 200n. There are a number of ways this may be achieved. For example, the server 100 (or first user device 200a) may omit sending the marked data to the user devices 200n of unauthorised users.

While it has been described that the debugger 105 is located at the server 100, it will be appreciated that each user device 200 may comprise a debugger. The GUI 400 may provide access to the debugger located at the user device 200. For example, each user wanting to use their own debugger may be able to download the debugging data 104 from the server 100, and execute their local debugger using the debugging data 104 at their user device 200. Data such as the temporal position within the program, position within the computer code, or comments may still be added and uploaded to the server 100. The server 100 may then communicate the received data to the other user devices 200 such that the other user devices 200 may update their graphical user interfaces. In some implementations, one user may use a local debugger on their user device, while a second user may use the debugger located at the server 100.

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

The invention claimed is:

1. A system for debugging a computer program comprising computer readable program code, the system comprising:

debugging data comprising replay debugging data for replaying an execution of the computer program;

first and second user devices, configured to display a first and second graphical user interface respectively, each graphical user interface comprising data indicative of an execution of a debugger processing the debugging data, said execution of the debugger comprising replaying the execution of the computer program using the debugging data;

the first and second graphical user interfaces each configured to:

simultaneously display data indicative of a temporal position within the replay of the execution of the computer program associated with the first graphical user interface and display data indicative of a temporal position within the replay of the execution of the computer program associated with the second graphical user interface; and display data indicative of a position within the computer readable program code associated with the other one of said graphical user interfaces.

2. The system of claim 1, wherein the first and second graphical user interfaces are each further configured to:

display data indicative of the position within the computer readable program code associated with the first and second graphical user interfaces respectively.

3. The system of claim 1, wherein the first and second graphical user interfaces are configured to display data indicative of the execution of the debugger simultaneously.

4. The system of claim 1, further comprising a server, the server comprising:

the debugging data; and wherein the server is configured to provide the first and second user devices with access to the debugging data.

5. The system of claim 4, the server further comprising:

the debugger; and wherein the server is configured to provide one or both of the first and second user devices with access to the debugger.

6. The system of claim 4, wherein the server is configured to:

send to the first user device, the data indicative of the temporal position and the data indicative of the position within the computer program readable code associated with the second user device; and send to the second user device, the data indicative of the temporal position and the data indicative of the position within the computer readable program code associated with the first user device.

7. The system of claim 4, wherein the server is further configured to:

determine that the first user has marked a portion of data; and based on said determination, prevent the second user device from accessing said portion of data.

8. The system of claim 4, wherein the server is configured to:

receive an indication that user has marked a portion of data as private;

generate metadata associated with the portion of data, the metadata indicating that the portion of data is private;

receive a request for access to the portion of data;

identify the metadata associated with the portion of data, the metadata indicating that the portion of data is private; and prevent access to the portion of data.

9. The system of claim 1, wherein the first and second graphical user interfaces are configured to present a timeline of the computer program, the timeline comprising the data indicative of the temporal position within the replay of the execution of the computer program associated with the other one of said graphical user interfaces.

10. The system of claim 9, wherein the timeline comprising the data indicative of the temporal position of the execution of the computer program comprises presenting a marker on the timeline at a temporal position on the timeline corresponding with the temporal position within the relay of the execution of the computer program associated with the other one of said graphical user interfaces.

11. The system of claim 1, wherein the first and second graphical user interfaces are further configured to:

display data indicative of a comment added by one of the first or second devices.

12. The system of claim 11, wherein the data indicative of the comment is displayed as a user selectable icon on the graphical user interface, wherein user selection of the icon causes the graphical user interface to display the comment.

13. The system of claim 12, wherein the data indicative of the comment has an associated position within the computer readable code, and wherein the graphical user interface is further configured to display a portion of the computer readable program code at the associated position within the computer readable program code upon user selection of the icon.

14. The system of claim 12, wherein the user selectable icon is displayed on the timeline at a temporal position associated with the comment.

15. A method for debugging a computer program comprising computer readable program code, the method comprising:

displaying on first and second user devices respective first and second graphical user interfaces displaying data indicative of an execution of a debugger processing debugging data, the debugging data comprising replay debugging data for replaying an execution of the computer program, and where said execution of the debugger comprises replaying the execution of the computer program using the debugging data, wherein the displaying comprises, at the first and second graphical user interfaces:

simultaneously displaying data indicative of a temporal position within the replay of the execution of the computer program associated with the first graphical user interface and data indicative of a temporal position within the replay of the execution of the computer program associated with the second graphical user interface; and displaying data indicative of a position within the computer readable program code associated with the other one of said graphical user interface.

16. A non-transitory computer readable medium carrying computer readable code, that when executed, causes one or more processors to carry out the method of claim 15.

17. A user device for use in debugging a computer program comprising computer readable program code, the user device comprising:

a transceiver, the transceiver configured to receive:

data indicative of a temporal position within a replay of the execution of the computer program associated with a second user device and data indicative of a position within the computer readable program code associated with a second user device;

a display comprising a graphical user interface configured to display data indicative of an execution of a debugger processing debugging data, the debugging data comprising replay debugging data for replaying an execution of the computer program, and where said execution of the debugger comprises replaying the execution of the computer program using the debugging data, wherein the graphical user interface is configured to:

simultaneously display the data indicative of the temporal position within the replay of the execution of the computer program associated with the second user device and the data indicative of the temporal position within the replay of the execution of the computer program associated with the user device; and display the data indicative of the position within the computer readable program code associated with the second user device.

18. A server for use in debugging a computer program comprising computer readable program code, the server comprising:

a memory comprising debugging data comprising replay debugging data for replaying an execution of the computer program;

a processor configured to execute a debugger using the debugging data, said execution of the debugger comprising replaying the execution of the computer program using the debugging data; and a transceiver configured to:

simultaneously send to a first user device data indicative of a temporal position within the replay of the execution of the computer program associated with a second user device, and send to the second user device data indicative of a temporal position within the replay of the execution of the computer program associated with the first user device;

the transceiver further configured to send data indicative of a position within the computer readable program code associated with the second user device.

* * * * *